INVENTOR.
EUGENE W. HINES
BY
ATTORNEY

INVENTOR.
EUGENE W. HINES

Aug. 5, 1969 E. W. HINES 3,460,015
POSITIONING CONTROL SYSTEM
Filed Jan. 12, 1966 5 Sheets-Sheet 4

INVENTOR.
EUGENE W. HINES
BY
ATTORNEY

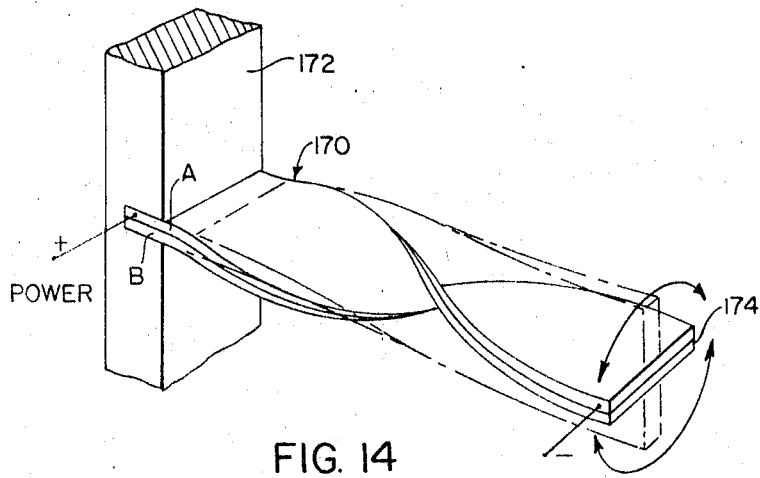
FIG. 14
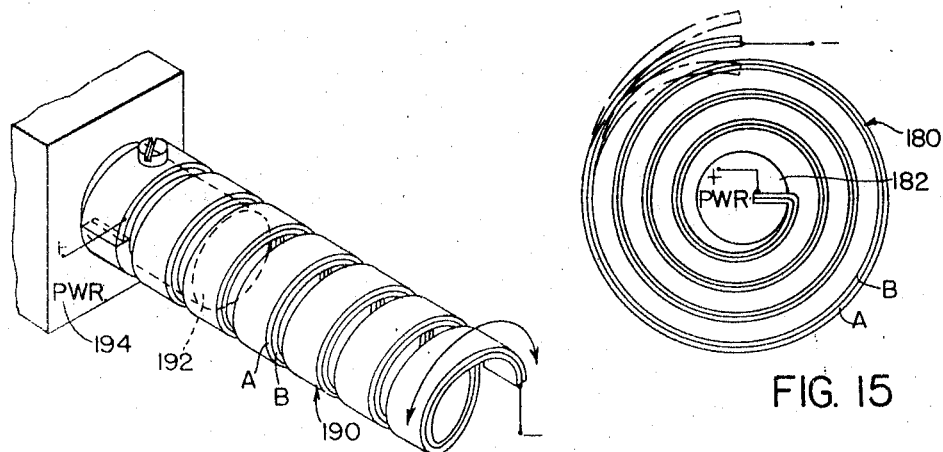
FIG. 15
FIG. 16
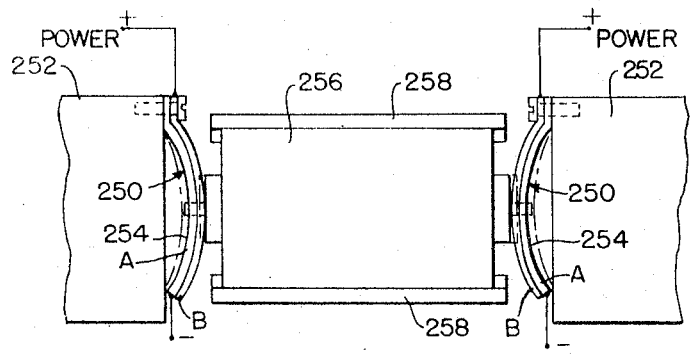
FIG. 17
*INVENTOR.*
EUGENE W. HINES

United States Patent Office 3,460,015
Patented Aug. 5, 1969

3,460,015
POSITIONING CONTROL SYSTEM
Eugene W. Hines, Grand Blanc, Mich., assignor to E. W. Hines and Associates, a joint venture
Filed Jan. 12, 1966, Ser. No. 520,178
Int. Cl. H02n 7/00
U.S. Cl. 318—117                                 9 Claims

ABSTRACT OF THE DISCLOSURE

A positioning control system for controlling the motion of a movable member in response to an element being sensed. Sensing means are provided to sense the element and generate an electric signal representative of a condition of the element. This signal is compared against a reference signal and the resulting output signal is used to activate a Peltier device to produce expansion, contraction and/or mechanical distortion of the bimetallic Peltier device. The movable member is moved in response to the expansion, contraction and/or mechanical distortion to cause the sensed signal to approach the reference signal.

---

The invention relates to apparatus for controlling the motion of a movable member, and more particularly relates to a control device utilizing the Peltier effect.

In the past the Peltier effect has been primarily of theoretical interest, has had very scant practical application, and has in the main been considered a laboratory curiosity. The present invention avails itself of the Peltier effect in providing accurately controllable positioning systems and motion regulating devices.

It is an established fact that the density of free electrons in a metal differs from one metal to another and, in a given metal, depends upon the temperature. When two different metals are connected to form a junction, electrons diffuse from one into the other. The junction acts as a seat of EMF, and if there is current from one metal to the other, energy is either liberated or absorbed. The transfer of energy is in the form of a flow of heat between the junction and its surroundings. This heat transfer is known as the "Peltier heat," after its discoverer, Jean C. A. Peltier, the French physicist. Experiment has shown that the Peltier heat transferred at any junction is proportional to the quantity of electricity crossing the junction, and that it reverses its direction of flow when the electric current is reversed. The number of joules of heat absorbed or liberated at a junction of metals A and B per coulomb of electricity transferred is called the Peltier EMF $\pi_{AB}$. It has been found that $\pi_{AB}$ depends not only on the nature of the two metals, but also on the temperature of the junction, and that it is independent of any other junction that may be present.

As a representative example only, the metal A could be iron or steel and the metal B could be copper. These metals when conjoined form a junction. When electrical conductors are affixed to metals A and B so that an electrical current will pass into them to their junction, the Peltier effect will occur at that junction. The Peltier effect may be used to transfer heat from a cold junction to a hot junction, either to heat the latter or to cool the former.

In one embodiment, the present invention provides apparatus for controlling the motion of a movable member in response to an element being sensed. The sensed element is adapted to be operated upon by the movable member, for example—a cutting tool. Sensing means are provided to sense or measure the element and to generate an electric sensor signal representative of a condition or dimension of the element being sensed. Reference means are provided to generate a reference electric signal equal to a signal that the sensing means would generate when the desired condition or dimension of the element is being sensed. Comparing means are provided for comparing the reference signal and the sensor signal and for producing an output electric signal in response thereto. A Peltier device is provided including a first element formed of a first metal and a second element formed of a second metal different than the first metal. The first and second metal elements have a common junction or junctions. The Peltier device is activated by the output signal of the comparing means selectively to liberate or absorb electric energy thereby producing an expansion, contraction and/or mechanical distortion. The movable member is moved in response to the expansion, contraction and/or mechanical distortion produced in the Peltier junction. The movable member in turn operates in some conjunction with the sensed element in such a manner as to cause the sensor signal to approach the reference signal.

The present invention also provides a Peltier control device including a first element formed of a first metal, and a second element contacting the first element at a junction and formed of a second metal different than the first metal. A source of electricity has one terminal connected to the first element and another terminal connected to the second element for causing an electric current to flow between the first and second elements. A movable control member is disposed adjacent the first or second element and is mechanically secured thereto. An insulator is disposed between the control member and the first or second element and electrically insulates the control member from the first or second element. The motion of the control member is selectively controlled in response to the electric current flowing between the first and second elements which evolves or absorbs heat at the junction. This causes the control member to move in response to the resulting expansion or contraction of the control member and the first and second elements.

In one particular application, the present invention provides a positioning system for controlling the spacing between rolls in a rolling mill. Rolls, having their axes parallel to each other, are juornalled in bearings which are movable within a stationary frame. In some instances, metal blocks which have internal passages for conducting a fluid have been secured to the bearings, and means provided for supplying fluid at a variable temperature to the passages. Peltier control device, having a bimetallic junction therein, can be secured to or within at least one of the metal blocks. A source of electric current is connected to the control device. Sensing means control the electric current in response to a dimension of a product being rolled in the rolling mill. The electric current causes heat to be liberated or absorbed at the Peltier junction so that at least one of the metal blocks moves in expansion or contraction thereby controlling the spacing between the rolls.

Another application of the inventive construction is in machine tools, wherein a member mounting a metal cutting or machining tool, or a grinding wheel, or other material working tool is moved incrementally or positioned precisely by the Peltier device which is connected or associated with the machine tool. The electrical control circuit, embodying a signal emitting sensor, a reference signal emitter, an error correction detector receiving both signals and emitting a signal comprising their algebraic difference, provides an infinitely variable electrical current to the Peltier junction for its thermal expansion or contraction, or for its mechanical distortion, that produces the required mechanical motion at the movable member.

It is an object of the invention to provide a Peltier control device, for regulating the motion of any movable member, including tools, valves, switches, shutters, dies, rolls and the like in rolling mills, presses, coining equipment, and machine tools, and for controlling the motion of a movable member in response to an element being sensed, as in servomechanisms, inertial guidance systems and other navigational equipment, for precisely controlling the opening and closing of lenses and other apertures in accordance with relayed intelligence, and for accurately and precisely controlling the temperature of furnaces, ovens, dehumidifiers, air conditioners, and the like.

Another object is to provide a Peltier control apparatus for the exertion or relaxation of pressure on any substance under the direction of a selective electric circuit embodying a pressure sensing means.

Another objective is to provide a Peltier device in a no-lost-motion positioning and corrective navigational means for operating manned or unmanned (drove) submarines and missiles, or for tracking manned or drove vehicles and objects at, above and below sea level.

An additional object is to provide a mechanism utilizing the Peltier effect in response to non-vibratory, continuous flow direct current or to fully rectified alternating current having a very slight pulsation of acceptable tolerance.

Another object is to provide a control device achieving a multiplication of the Peltier effect in localized areas, and which may be used in movement or motion control.

Other features, advantages and objects will be more readily apparent from the following detailed description of representative embodiments of the hereindescribed invention. The description refers to the accompanying drawings wherein:

FIGURES 14 and 16 are perspective views of Peltier control devices arranged for circular mechanical motion effects.

FIGURE 15 is a plan view of another Peltier control device arranged for a circular mechanical motion effect.

FIGURE 17 is a plan view of another Peltier control system for imparting controlled motion to a movable member.

Figure 1:
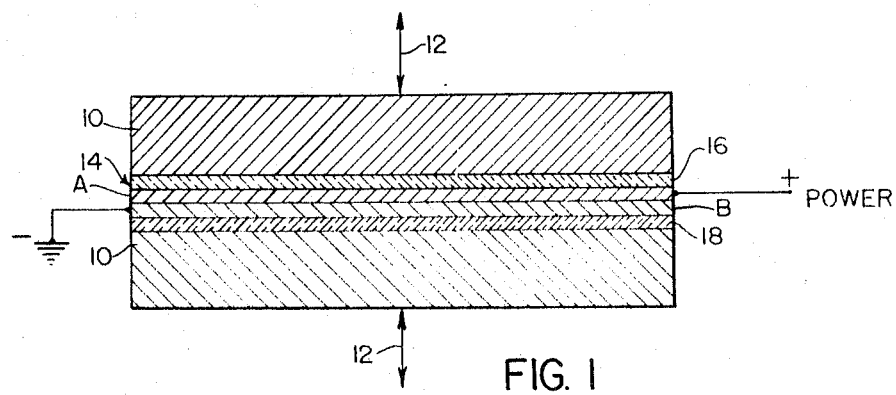
FIGURE 1 is a cross-sectional view of one Peltier embodiment in the present invention, showing a single Peltier control unit sandwiched between two electric insulators and two bodies of other material.

One arrangement of a Peltier device as used in the present invention is illustrated in FIGURE 1. A body 10 of material, such as iron, steel, etc., which is adapted to move and/or expand and contract in the directions indicated by the double-head arrows 12, is disposed on either side of an insulated Peltier device 14. The Peltier device comprises a metal plate A contiguous and forming a junction with a metal plate B. Plate A is formed of a different metal than that of plate B. For instance, plate A could be a highly conductive metal such as copper or aluminum, and plate B could be steel, iron, or other less conductive metal. The Peltier junction formed by or between plates A and B acts as a seat of EMF, and when there is a current from one metal plate to the other, electric energy in the form of a flow of free electrons is either liberated or absorbed. This is known as the Peltier heat which is proportional to the quantity of electricity crossing the junction, and will reverse its direction of flow when the electric current is reversed. The number of joules of heat absorbed or liberated at the junction of plates A and B per coulomb of electricity transferred depends not only on the nature of the two metals, but also on the temperature of the junction. Thus, it may be important in a particular application of the present invention to take into consideration the ambient temperature conditions to be experienced during the progress of the particular application.

A layer 16 of insulating material is disposed between plate A and the upper body 10 to insulate electrically plate A from upper body 10, but to permit heat to flow between plate A and upper body 10. A similar layer 18 of insulating material is disposed between plate B and lower body 10 to insulate electrically plate B and lower body 10.

When a direct electric current flows in one direction across the junction, heat may be liberated at the junction causing the bodies 10 to expand or move away from the junction. On the other hand, when a direct electric current flows in the opposite direction across the junction, heat may be absorbed causing bodies 10 to contract or move toward the junction. This selectively controllable motion of bodies 10 enables the present invention to be employed in an infinite variety of applications, embodiments and environments wherever it is desired to impart controlled motion to an element or member of a device. For example, the present invention may be used to control motion in many types of machine tools, servomechanisms, inertial guidance systems, damping devices, temperature controls, instrumentation, control valves, etc.

Figure 2:
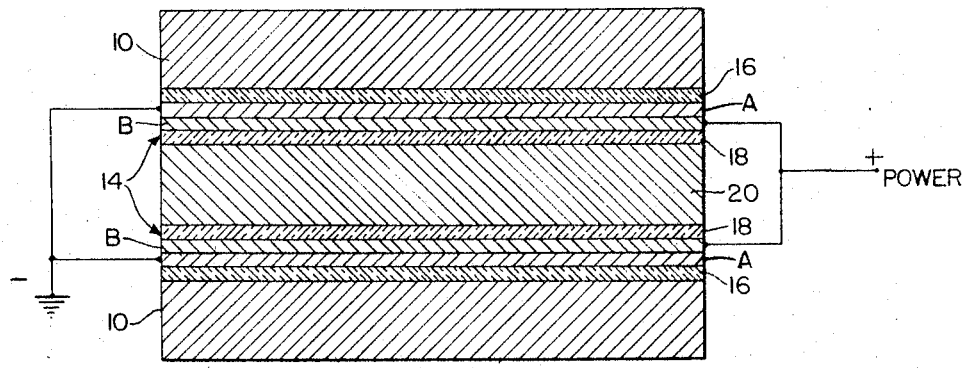
FIGURE 2 is a cross-sectional view of a second embodiment showing a multiple effect Peltier control unit.

FIGURE 2, shows an embodiment of the invention wherein a central body 20 is sandwiched between two Peltier devices 14, similar to the one shown in FIGURE 1. Central body 20 may be formed of a material which is the same as or different from that of bodies 10, depending on the desired effect and application. In FIGURE 2 a common direct current source supplies current to both Peltier devices, but separate sources may be used where desired. It can be readily seen that the FIGURE 2 embodiment will provide an increased or multiplied expansion or contraction effect, and this effect can be further increased or multiplied by the further combining of additional units similar to the one depicted in FIGURE 1. In addition to the motion of bodies 10 in FIGURE 2 and the FIGURE 2 unit as a whole, it should be appreciated that central body 20 may be subjected to an increased stress because it is sandwiched between two Peltier devices.

Figure 3:
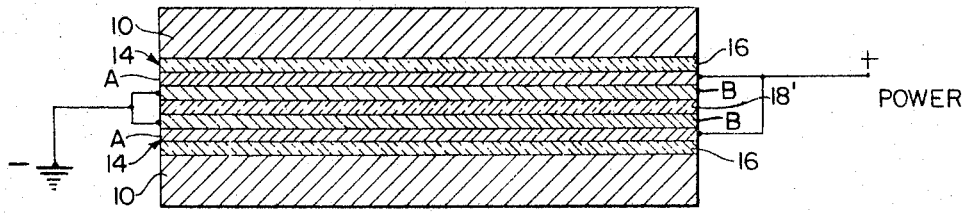
FIGURE 3 is a cross-sectional view of a third Peltier embodiment in the present invention, showing a concentrating multiple effect Peltier control unit for achieving an augmented effect in a localized area.

FIGURE 3 shows another embodiment of a Peltier device in the invention, wherein two Peltier devices 14 are arranged in close proximity to each other to produce an augmented, local expansion or contraction wherever required. A common direct current source supplies both Peltier devices, as in FIGURE 2. The FIGURE 3 embodiment replaces the two electric insulators 18 and the central body 20 of the FIGURE 2 embodiment with a single electric insulator 18'.

Figure 4:
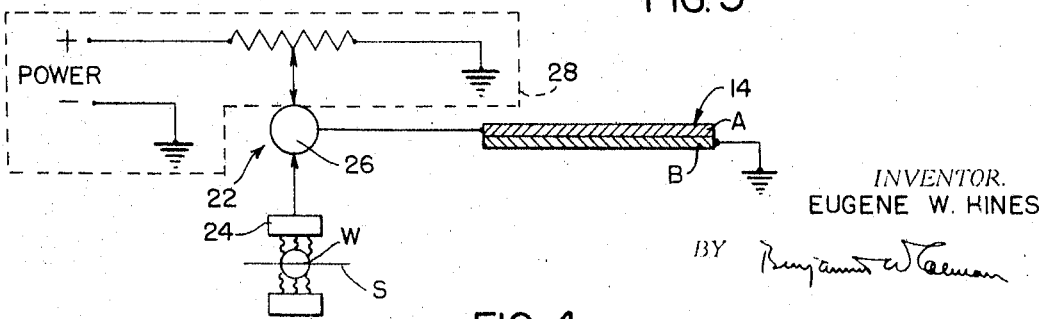
FIGURE 4 is a schematic view of a representative electrical control circuit for use in combination with and for control of any of the units shown in FIGURES 1, 2 and 3.

FIGURE 4 shows one possible electrical control circuit 22 for controlling a Peltier unit in response to a sensor signal. A gage 24 is used to measure, for example, the thickness of a sheet S or a dimension of a workpiece W. The gage 24 sends an electric signal representing the measured dimension to an error detector circuit unit 26. The detector 26 also recives a preset electric signal from a potentiometer 28. The potentiometer signal is preset to be equal to a signal which gage 24 would send if the dimension being sensed were of the desired value.

The output of the detector 26 is connected to a Peltier unit 14 similar to the one shown in FIGURE 1. The detector 26 produces an output signal which is the algebraic difference between the preset signal and the gage signal. For example, if the preset signal is 10 milliamperes and the gage signal is 8 milliamperes, then the output signal sent to the Peltier unit would be +2 milliamperes (i.e., 10−8=+2), which would cause and expansion that may be utilized to operate on the dimension to be sensed so as to increase the gage signal. On the other hand, if the preset signal is 10 milliamperes and the gage signal is 12 milliamperes, then the output signal sent to the Peltier unit would be −2 milliamperes (i.e., 10−12=−2), which would cause a contraction that may be utilized to operate on the dimension to be sensed so as to decrease the gage signal. Of course, if the preset signal is equal to the gage signal, then the output signal of detector 26 would be zero.

Figure 5:
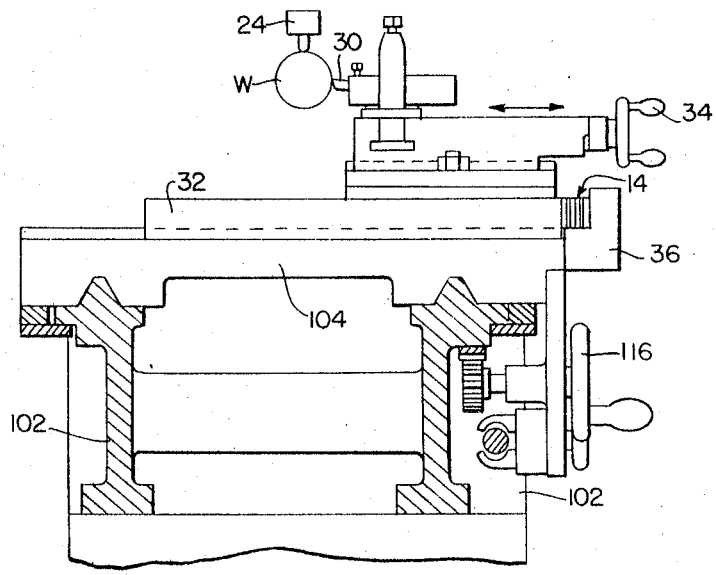
FIGURES 5 and 6 are cross-sectional views of another embodiment of the present invention, showing the crosshead tool of a lathe controlled from either one (FIGURE 5) or two sides (FIGURE 6), by the novel apparatus.

FIGURE 5 illustrates a cross-section of a lathe whose crosshead tool is controlled by a Peltier unit of the present invention. A workpiece W is mounted between a chuck and a tailpiece for rotation. The workpiece W is to be machined by tool 30 and measured by gage 24. The tool 30 is secured to the translatable crosshead bed 32. The tool 30 is coarsely adjusted and brought into the general vicinity of workpiece W by rotating the manual crank 34. A Peltier unit 14, similar to the one shown in FIGURE 1, is then positioned between the translatable bed 32 and the stationary lathe frame 36. An electrical control circuit such as the one shown in FIGURE 4 may be used to control the machining operation of the FIGURE 5 embodiment. That is, the fine adjustment or control of the motion of tool 30 relative to workpiece W is controlled by the expansion and contraction of the Peltier unit 14. Many other machine tools, presses, and coining equipments may be similarly accurately controlled with suitable embodiments.

Figure 6:
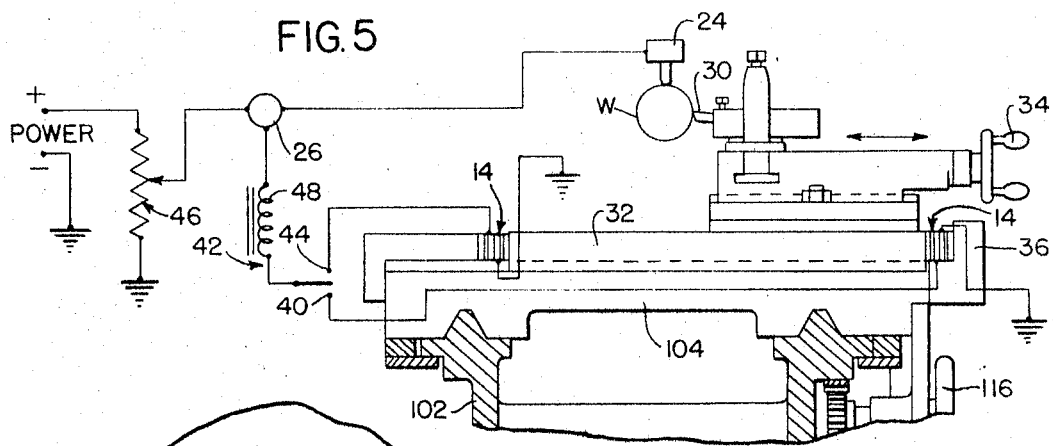

FIGURE 6 shows a cross-section of a lathe similar to that shown in FIGURE 5. In addition, the embodiment of FIGURE 6 includes two Peltier devices 14, and the associated electrical circuitry which may be used to control the electrical input to the Peltier devices. One Peltier device 14 is positioned, similar to the Peltier device 14 of FIGURE 1, on the right side of the translatable crosshead bed 32 upon which the crosshead tool 30 is rigidly secured. Metal plate A of Peltier device 14 is electrically connected to terminal 40 of a single-pole double-throw relay 42, and metal plate B of the Peltier device is electrically connected to ground.

The other Peltier device 14 is positioned on the left side of the translatable crosshead bed 32. Metal plate A of this Peltier device 14 is electrically connected to terminal 44 of relay 42, and metal plate B of the Peltier device 14 is electrically connected to ground.

A sensor or gage 24, similar to the gage of FIGURE 4, is positioned adjacent the workpiece W and measures the radius or diameter of the rotating workpiece W. Gage 24 transmits a signal to an error detector circuit 26 which is proportional to the reading of the gage 24. Another input signal is transmitted to detector circuit 26 by a potentiometer 46 that is preset to transmit a signal equal to a signal that the gage 24 would transmit at the desired radius of workpiece W.

Error detector circuit 26 supplies its output signal to relay coil 48, and this output signal is equal to the algebraic difference between the two input signals to the detector circuit 26. When the two input signals are equal, then the output signal of the detector circuit 26 would be zero.

When the signal from gage 24 exceeds the preset signal from potentiometer 46, then the detector circuit 26 supplies an output signal to coil 48 which moves the switch to complete the connection to terminal 40. In this condition an electric current is supplied to the first Peltier device 14, which then increases in temperature, expands and thus urges the bed 32 toward the left as shown in FIGURE 5. This urges the tool 30 to cut deeper into the workpiece W, and thus causes the signal from gage 24 to approach the value of the preset signal from potentiometer 46. It should be noted that in this condition, no electrical current is being supplied to the second Peltier device 14 at the left in FIGURE 6.

When the signal from gage 24 is less than the preset signal from potentiometer 46, then the detector circuit 26 supplies an output signal to coil which moves the switch to complete the connection to terminal 44. In this condition an electric current is supplied to the left Peltier device 14, which then increases in temperature, expands and thus urges the bed 32 toward the right as shown in FIGURE 6. This urges the tool 30 toward the right and to increase the diameter. It should be noted that in this condition, no electrical current is being supplied to the Peltier device 14 at the right. In certain applications, it may be desired to set the signal from potentiometer 46 to correspond to a radius that is slightly larger than the desired workpiece radius.

Figure 7:
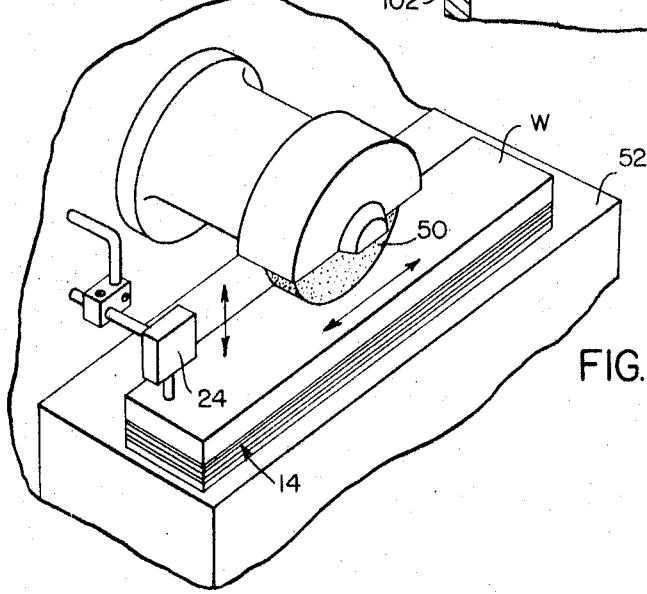
FIGURE 7 is a perspective view of another embodiment of the present invention, showing a Peltier control unit controlling the vertical feed of work in a grinding machine.

Another application for the positioning control system of this invention is shown in FIGURE 7, wherein a grinding machine is provided with a grinding wheel 50 and a magnetic chuck 52 for holding a workpiece W in a rigid fashion while the grinding operation is proceeding. Interposed between workpiece W and magnetic chuck 52 is an electrothermal Peltier control device 14, similar to the one shown in FIGURE 1. As the grinding wheel 50 rotates and grinds the upper surface of workpiece W, the magnetic chuck-Peltier device-workpiece ensemble translates back and forth horizontally beneath the grinding wheel 52 and a sensor or gage 24. The gage 24 senses the surface being ground and generates an electric sensor signal, in the same manner as gage 24 functions in the FIGURE 4 embodiment. An electrical control circuit, as shown in FIGURE 4, may be used to control the Peltier device 14 of FIGURE 7. Heat produced by the Peltier device 14 will cause an expansion or contraction, that will in effect control the vertical feed of workpiece W toward or away from the grinding wheel 50. As the grinding proceeds, the gage 24 continuously senses the surface being ground. The Peltier device 14 and associated electrical control circuitry achieve a very fine and accurate vertical motion regulation of the workpiece W which involves no lost motion. Fluctuations in the starting, ambient, and grinding temperatures should be taken into consideration in the particular application involved.

Figure 8:
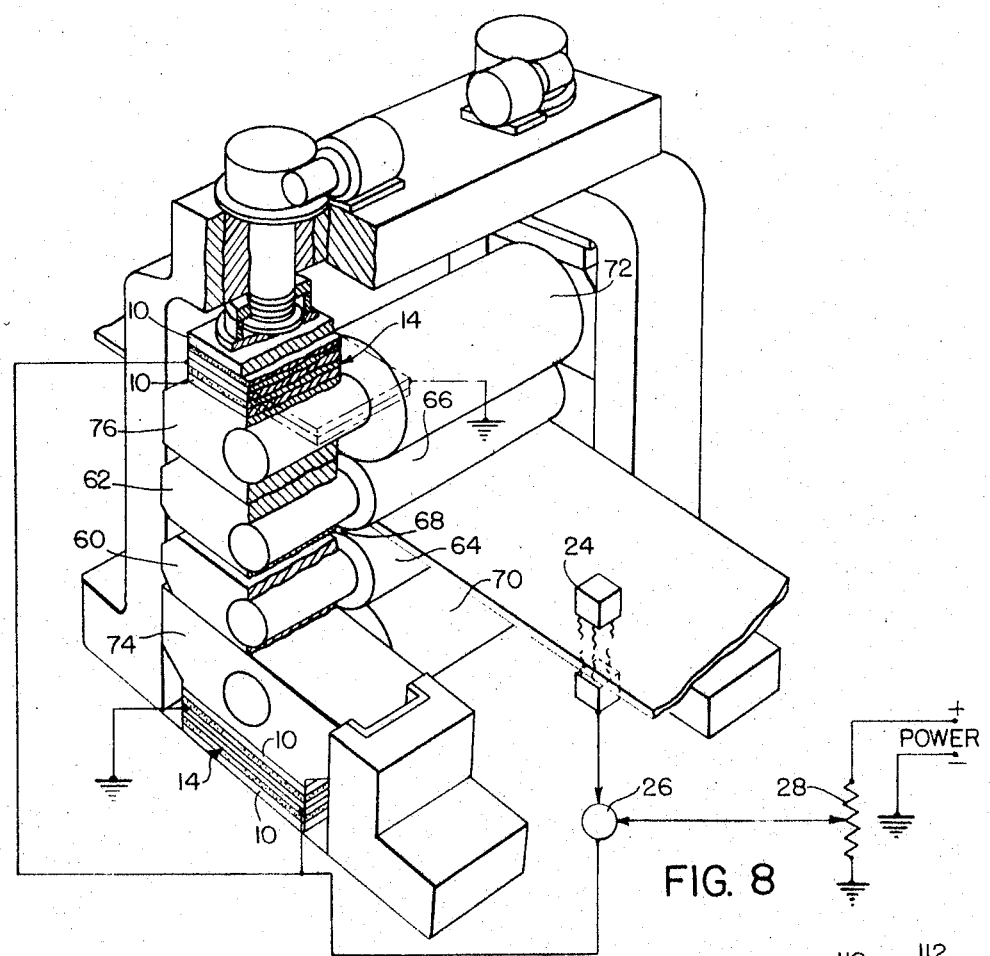
FIGURE 8 is a perspective view of another embodiment of the present invention, showing a Peltier positioning control system to control the spacing between rolls in a rolling mill.

Another application of the Peltier positioning control system is that shown in FIGURE 8. Here, a rolling mill embodies the novel Peltier roll positioning system of the present invention. Journaled in bearings 60 and 62 are two rolls 64 and 66 respectively having their axes parallel to each other. A strip or sheet S is rolled through a gap 68 between rolls 64 and 66. Contiguous with and parallel to these rolls are the backup rolls 70 and 72 which are more massive than rolls 64 and 66. Adjacent to bearings 60 and 62 are bearings 74 and 76 which journal the backup rolls 70 and 72 respectively. Contiguous to the top of bearing 74 and contiguous to the bottom of bearing 76 are separate Peltier control devices 14, similar to the device shown in FIGURE 1. Each of the Peltier control devices are selectively activated by the electrical output of the detector 26, similar in function to the detector 26 described in connection with FIGURES 4 and 6. Here again, the output signal of detector 26 is the algebraic difference between the preset signal from the reference potentiometer 28 or 46 and the sensor signal from gage 24 which senses the precise thickness of strip or sheet S as it emerges from the gap 68. The preset signal is set to a value corresponding to a sensor signal which gage 24 would transmit if the desired thickness were present.

Depending on the relative values of the sensor signal and the preset signal, the detector 26 sends electrons to or draws electrons from the Peltier control devices 14. This causes corresponding expansions or contractions of the bearings 74 and 76 which positions rolls 64 and 66 to provide the desired gap 68. This novel roll positioning system constitutes in effect a single, continuous closed-loop servomechanism with little, if any, lost motion or time lag to achieve a strip or sheet S of uniform thickness.

Figure 9:
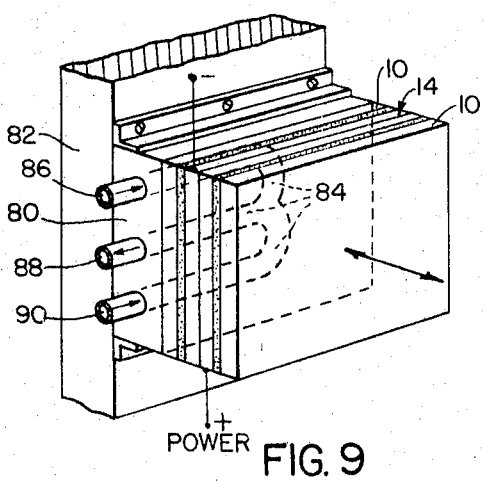
FIGURE 9 shows a modification of the Peltier positioning control system embodying a member into which fluids of varying temperature are introduced.

Another combination of the Peltier device 14 with an auxiliary expansion block or pad is that illustrated in FIGURE 9, in which a block 80 which is subject to thermal expansion or contraction is supported upon the member 82. A Peltier device 14 similar to that illustrated in FIGURE 1 is secured to the block 80, which is provided with passageways 84 interconnecting the conduits 86, 88 and 90 through which fluids at different temperatures can be passed to and from the passageways, heating or cooling the block 80. Reference can and should be made to Hautau Patent No. 3,201,962 for further details in respect to block 80, which is basically a feature of gross, rather than precision, expansion of contractions, and apparently has substantial time lag in either direction.

Figure 10:
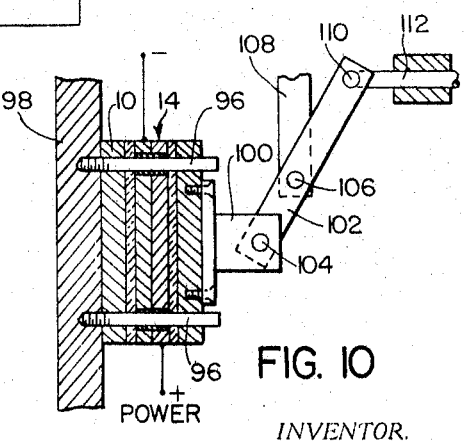
FIGURE 10 is a fragmentary sectional view, partly in elevation, showing the Peltier control system with mechanical linkage for developing a multiplied motion output effect.

A representative example of a structure providing a multiplication of motion effect is that illustrated in FIGURE 10. It is not by any means the only structure that can produce such multiplication effect. Here again, the Peltier device or transducer 14 is mounted by pins 96 upon a support 98 so that the plate 10 at the exposed side of the Peltier unit is free to move under the heating or cooling effect generated through the admission of direct current thereto. The plate 10 supports a yoke 100, a lever 102 being pin connected at 104 to the yoke and pivoted at 106 by a pin supported in the member 108, the other end of the lever 102 being pin connected a 110 to a member 112 which is to be moved. One or more such members may be used to multiply or divide the effective movement at the yoke 100. The pivots and pins should have a medium or high interference fit to remove all play at such connections, in order to provide a maximum of positioning control at the effective output end of the system.

To this point this specification has disclosed the utility and construction of a Peltier device in a thermal expansion or contraction positioning control system. The Peltier device however can also be used for positioning control in a combination which employs the mechanical distortion of a Peltier device secured at one end free at its opposite end to flex in one direction or the other depending upon the direction of current flow into the conjoined dissimilar metals.

Figure 11:
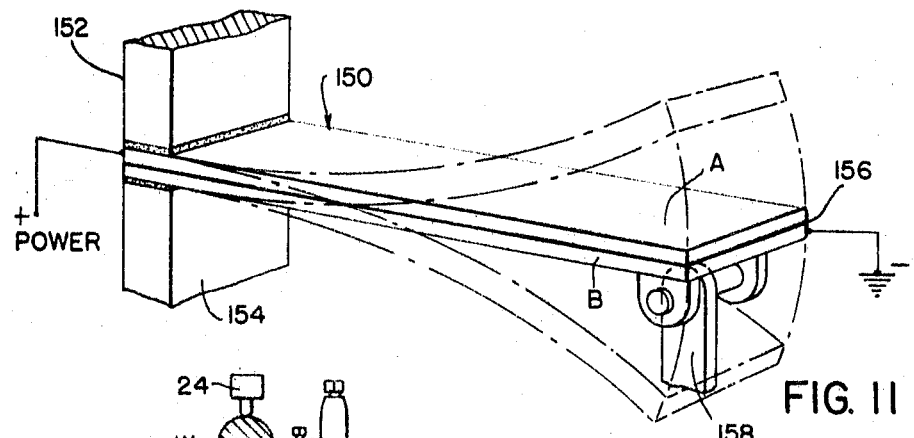
FIGURE 11 is a perspective view of a Peltier control device arranged to impart motion by mechanical distortion.

A representative embodiment of such a structure is fragmentarily illustrated in FIGURE 11, in which the dissimilar metals A and B of the Peltier transducer device 150 are held in fixed position between the support members 152, 154. The circuitry of FIGURE 4 can be used with the device 150. At the outboard or cantilevered end of the metal strips A and B, they are joined together into a junction 156, either mechanically or metallurgically. A member 158 to be moved by the Peltier transducer is secured, either fixedly or pivotally (as shown) to the outboard end of the device for maximum movement effect.

When direct current is passed in one direction into the metal A, it will pass the free electrons of the current to the junction 150 where either a heating or a cooling effect will occur. The free end of the transducer will bend in one direction or the other under such effect, imparting motion and movement to the member 158. Upon reversal of the current, flexing will occur in the opposite direction, again imparting motion to the member 158.

Figure 12:
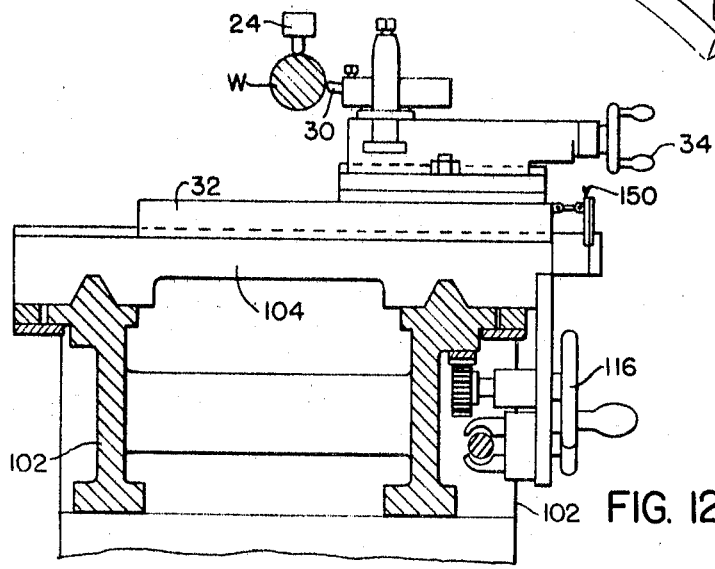
FIGURES 12 and 13 are vertical substantially elevational views of lathes (machine tools) embodying the Peltier control arrangement shown in FIGURE 11.
Figure 13:
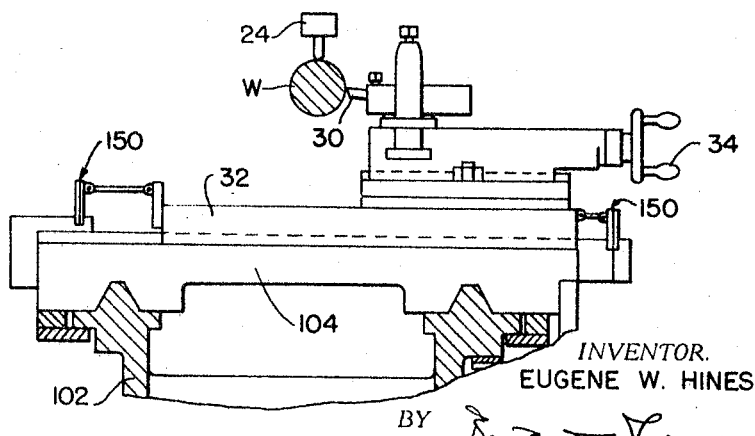

One example of an application of the above Peltier effect is that illustrated in FIGURES 12 and 13, wherein the device 150 is embodied as a single unit (FIGURE 12), or in duplicate (FIGURE 13). The circuit wiring for the devices 150 in the lathes of FIGURES 12 and 13 is substantially the same as that illustrated in and described in respect to the machine tools shown in FIGURES 5 and 6. Thus, when current is passed to the Peltier device 150 mounted in the lathe of FIGURE 12, the Peltier unit will flex or bend to draw the tool bit outwardly and thus increase the diameter being machined in the work W, or remove the tool bit inwardly to reduce the diameter. The combination of two Peltier units 150 in the lathe of FIGURE 13 can be circuit arranged and served to multiply the effective motion resulting from the flexing action of the units, or the circuit can be so arranged that one of the devices 150 can receive one quantity of current at any one time while the second device receives a proportionally different amount of current of the same or opposite polarity to produce in the Peltier units the desired controlled motion effect upon the tool bit.

It will be understood of course that the relay portion 42 of the circuit shown in FIGURE 6 is readily adaptable to modification so that both terminals 42 and 44 can be served simultaneously by the electrical output signal current from the detector unit 26, instead of being served alternatively.

Since the flexing action of the Peltier unit 150 in either direction tends to draw the associated movable element or member toward the fixed end of the unit, the Peltier unit or units can be arranged at the initiation of a positioning control operation to be put in a preflexed condition by the pre-application of current. Thereafter, a reduction in current will permit the unit to relax and tend to resume is initial unflexed form so as to extend the movable member away from the fixed end of the Peltier unit, and an increased current will generate greater flexing and thus draw the movable member toward the fixed end.

Additional applications of the mechanical distortion generated in a Peltier unit by the application of current of one or the other polarity are also to be considered. One of these is the twisted Peltier unit 170 illustrated in FIGURE 14 in which the dissimilar metals strips A and B, formed with the Peltier junction, are first twisted to take a set. The amount of twist can be varied, the unit showing in FIGURE 14 being twisted 180°. One end of the unit 170 is secured in the support member 172, the remainder of the unit including the junction 174 being cantilevered outwardly from the support member. The unit 170 can also be arranged in depending fashion. After twisting, the unit can be annealled to relieve the mechanical stresses induced by twisting. When direct current is applied to the metal strips oft he unit, the heat effect at the Peltier function, depending upon the polarity applied, will cause the Peltier unit 170 to twist further or to unwind. Either effect produces incremental motion proportional to the amount of applied current.

Another application of the Peltier unit is that of a wound-up coil, like the mainspring of a watch. Such a Peltier coil 180 is illustrated in FIGURE 15, wherein one end of the Peltier unit of dissimilar metals A and B is secured in a support member 182, the remainder of the unit to the other end thereof being coiled about itself. The free end of the unit will flex away from or toward the coil upon the application of current depending upon the polarity applied to the metal strips.

Still another application is that illustrated in FIGURE 16, showing a Peltier unit 190 secured to a post 192 mounted on the support 194. The Peltier transducer 190 is first coiled as a helical spring would be coiled. Then one end is secured to the post, the other end being free to twist or untwist as current of one as the other polarity is applied to the dissimilar metals A and B.

A further application of a preformed Peltier unit is shown in FIGURE 17, the Peltier transducer 250 being secured at one end to the support member 252, the other end being arranged in contact with the support member. The body 254 of the Peltier device, formed of dissimilar metal strips A and B, is arched and is in bearing contact with a movable slidable member 256, arranged to slide in ways 258, 258. When current is applied to the metal strips A and B, the Peltier device 250 will arch further, i.e. flex with increased curvature, causing the movable member 256 to move away from the left support 252, or will tend to flatten out and move the member 256 toward the left support. Movement in either direction will depend upon the polarity of the current applied to the metal strips A and B. By mounting the movable member 256 between two Peltier units 250, and by applying current of different polarity simultaneously to each of these units, the member 256 will be caused to move in one direction or the other in response to the magnitude of current imparted to each Peltier unit.

It will be understood that, as previously described, a highly rectified alternating current may, under allowable circumstances, be utilized to apply a very slightly pulsating current input to the Peltier unit or units. However, pure direct current is preferred, as such current is non-pulsating and the output expansion, contraction, or mechanical distortion will therefore not be vibratory in character.

As above described, the positioning control effected by a Peltier unit is infinitely variable in magnitude as well as in direction in response to the magnitude and the polarity of the applied current. In addition, the motion response is immediately effected, and the time lag limitations of an expansion or contraction effected by the application of fluids of different temperatures are avoided.

Although the expansion or contraction of metals, including bimetal members composed of dissimilar metals, can be effected by resistance heating, i.e. heating caused by the resistance of the metals, in the Peltier device the expansion, contraction or mechanical distortion of the unit is due to the free exchange of electrons between the dissimilar metals at their conjunction and there is no resistance heating effected in the metals themselves upon the application of dipolar electric current.

Having described the invention in its simplest terms, it is to be understood that the features of the system described may be changed or varied in greater or lesser degree without departing from the essence of the invention defined in the appended claims.

I claim:

1. In a positioning control system including a movable element to which controlled movement is to be imparted,
   a Peltier device for imparting said movement to said element,
   said Peltier device comprising two dissimilar metals conjoined together at a junction and arranged to produce and exhibit the Peltier effect upon the application of dipolar electrical current to said junction,
   means adapted to be moved associatedly conjoined with at least one of said materials and said element for imparting said movement to said element, and a sensing control circuit served by said current and electrically connected to said Peltier device, said Peltier device being cantilevered in a stationary member, one end of said device being free to move in response to and under the influence of said current flowing across said junction for imparting said movement to said element.

2. In a positioning control system including a movable element to which controlled movement is to be imparted,
   a Peltier device for imparting said movement to said element,
   said Peltier device comprising two dissimilar metals conjoined together at a junction and arranged to produce and exhibit the Peltier effect upon the application of dipolar electrical current to said junction,
   means adapted to be moved associatedly conjoined with at least one of said materials and said element for imparting said movement to said element, and a sensing control circuit served by said current and electrically connected to said Peltier device, one end of said Peltier device being fixedly secured in a stationary support, the other end of said device being free to move under the influence and in response to the application of said current to said junction for imparting said movement to said element.

3. The system defined in either of claims 1 or 2, wherein said dipolar electric current comprises a non-pulsating direct current.

4. The system defined in either of claims 1 or 2, wherein said current comprises a fully rectified alternating current.

5. The system defined in either of claims 1 or 2, wherein
   said Peltier device is mounted in operative association with a work performing mechanism,
   said work performing mechanism being position controlled for performing upon the work in response to the current input to said Peltier device.

6. The system defined in either of claims 1 or 2, wherein said metals are arranged in a planar conjunction and configuration.

7. The system defined in either of claims 1 or 2, wherein said metals are arranged in a set non-planar conjunction and configuration.

8. The system defined in claim 6, wherein the free end of said materials flex in one direction in response to the application of said current to said junction in one direction and flex in the opposite direction in response to the application of said current to said junction in the opposite direction.

9. The system defined in claim 7, wherein the free end of said materials flex in one direction in response to the application of said current to said junction in one direction and flex in the opposite direction in response to the application of said current to said junction in the opposite direction.

References Cited

UNITED STATES PATENTS

| | | | |
|---|---|---|---|
| 2,304,489 | 12/1942 | Wetzel | 158—28 |
| 2,910,836 | 11/1959 | Karrer | 62—3 |
| 3,097,027 | 7/1963 | Mims et al. | 308—189 |
| 3,124,936 | 3/1964 | Melehy | 62—3 |
| 3,152,451 | 10/1964 | Downs | 62—3 |
| 3,157,801 | 11/1964 | Shequen | 62—3 |
| 3,240,261 | 3/1966 | Morales | 165—2 |
| 3,250,543 | 5/1966 | Morgan | 280—6 |
| 3,259,887 | 7/1966 | Garwin | 340—173.1 |
| 3,264,714 | 8/1966 | Baer | 29—155.5 |
| 3,281,921 | 11/1966 | Danko et al. | 29—155.5 |

CHARLES W. LANHAM, Primary Examiner

A. RUDERMAN, Assistant Examiner

U.S. Cl. X.R.

62—3; 72—8, 16, 248; 77—32; 82—14; 90—21; 310—4